Jan. 28, 1969 A. E. J. BRANIGAN 3,424,523
MOTION PICTURE CAMERA HAVING A ROTATING GYROSCOPICALLY
STABILIZED LENS AND A VARIABLE ERECTION RATE MEANS
Filed Oct. 24, 1965 Sheet 1 of 3

INVENTOR.
Alan E. J. Branigan
BY
*Griffin and Branigan*
ATTORNEYS

INVENTOR
Alan E. J. Branigan

BY Griffin and Branigan

ATTORNEYS

INVENTOR
Alan E. J. Branigan

BY *Griffin and Branigan*

ATTORNEYS

· # United States Patent Office 3,424,523
Patented Jan. 28, 1969

3,424,523
MOTION PICTURE CAMERA HAVING A ROTATING GYROSCOPICALLY STABILIZED LENS AND A VARIABLE ERECTION RATE MEANS
Alan E. J. Branigan, Arlington, Va., assignor to Bell and Howell Company, Chicago, Ill.
Filed Oct. 24, 1965, Ser. No. 504,722
U.S. Cl. 352—243  22 Claims
Int. Cl. G03b 17/00

ABSTRACT OF THE DISCLOSURE

A movie camera has a lens thereof supported on a spinning spherically surfaced member which is self-erected by means of variable friction erection forces applied thereto in proportion to the camera's panning rate. In this manner low panning rates result in small friction erection forces and high lens stabilization sensitivities; whereas, rapid panning rates are accompanied by rapid erection of the spinning lens.

---

This invention relates to gyroscope erection systems and more particularly to a device for automatically varying the erection rate of an instrument's gyro-stabilized elements in accordance with changes in the instrument's operating conditions.

Modern instruments frequently have gyroscopically stabilized elements associated therewith. Usually, the gyroscope functions to stabilize particular elements of the instrument with respect to motion of the instrument's housing. In a thusly stabilized instrument the phenomenon of gyroscopic action is also present. That is, the tendency of a rapidly spinning body to turn about a second axis not parallel to the axis of spin, when acted upon by a torque about a third axis. Moreover, the rapidly spinning body tends to move in a direction which is perpendicular to the direction of the force which causes the torque. The reason that the spinning body moves perpendicularly to the direction of the force is because the angular momentum of the spinning body, and the torque caused by the force acting upon the body, resolve themselves in a direction perpendicular to the force. For example, if an airplane driven by a right-handed propeller is forced to the left by a gust of wind the gyroscopic action of the propeller makes the forward end of the propeller shaft rise. In this example, the airplane's roll axis corresponds to a gyroscope's axis of spin; the craft's yaw axis corresponds to a gyro's torque axis; and the plane's pitch axis corresponds to the gyro's precession axis.

The main purpose of an instrument's gyro stabilization structure is usually to isolate certain selected elements from undesirable vibrations. For example, it is frequently desirable for an optical instrument to have one or more of its lenses spatially stabilized against vibrations. That is, whether optical instruments are hand held or mounted upon a platform which is subjected to vibratory motion, the lenses thereof are generally unavoidably vibrated, thereby resulting in an undesirable image of the focal plane. This is particularly true in the case of a movie camera where vibrations are recorded on succesive frames of film which, when magnified during projection, produce a picture which is unpleasant to view and in some instances unintelligible. Several recently developed devices are available for stabilizing the lenses of optical instruments such as movie cameras whereby vibratory motions are filtered out.

In some instances, however, it is not only desirable that most types of vibratory motions be filtered out, but it is also desirable that large amplitude relatively slow motions of the instrument be followed by the stabilized element. When a photographer takes a picture with a movie camera, for example, he frequently desires to obtain a panoramic view of a particular scene. Hence, he swings the camera through an arc about his body as an axis. This operation is normally referred to as panning. If this panning motion were filtered out the photographer's camera would not be suited for its intended purpose. Other recently developed gyroscopic devices have partially solved this problem by providing structures wherein the camera's lens stabilization mechanism is sufficiently sensitive to filter out high frequency vibrations such as the photographer's jiggle, and is also adapted to permit the stabilized lens to follow relatively slow motions of the camera. That is, the axis of the stabilized lens very slowly erects itself into alignment with the displaced axis of the camera housing.

For the most part, these presently developed self-erecting devices employ spherical erection systems. In these systems frictional or eddy current forces are applied to a rapidly rotating spherical surface associated with the spin stabilized element. These erecting forces produce a suitable torque whereby the spinning element precesses into alignment with its instrument housing. During panning of a movie camera, for example, a thusly stabilized and erected lens precesses about an axis which is parallel to the axis about which the photographer swings the camera. In order for these self-erecting devices to be sensitive enough to maintain their spatial stability during high frequency vibrations, however, the erecting forces which give rise to the erecting precession must be quite small. Hence, because an increase in the erecting force decreases the instrument's sensitivity to high frequency vibrations, present stabilization systems have been generally unable to provide rapid enough erection rates. Consequently, although it is a general object of the invention to provide a variable erection mechanism, it is a more particular object of the invention to provide a structure which has both a high frequency stabilization sensitivity and a selectively rapid erection rate.

It is a further object of the invention to provide a lens stabilization structure wherein the erection rate of the lens is automatically varied to correspond to changing operating conditions to which the instrument becomes subjected. Again, a movie camera provides an example of a structure of the type wherein this object of the invention has particular importance. Assume, for example, that a photographer desires to take moving pictures of a jet airplane as it passes in front of the reviewing stand at an air show. In presently developed cameras, in order for the stabilized lenses to filter out the photographer's normal jiggle they cannot erect themselves rapidly enough to follow the camera's desired motion. This object of the invention, therefore, is to provide a device for automatically changing the camera lenses' erection rate in response to the camera housing's unusually rapid motion whereby the camera is rendered both vibrationally stable and able to photograph the fleeting aircraft.

In accordance with the principle of the invention an instrument is first provided with a self-erecting lens stabilization system and a means for sensing the changing conditions under which the instrument is operating. The sensing means delivers a signal representative of the changing conditions to a device which is operative in response to the representative signal to change the size of the erecting force on the spherical erecting surface. In this manner the erection rate of the stabilized element is varied in accordance with the changing conditions.

In the camera panning illustration, for example, the structure of the invention senses the relative motion between the stabilized lens and the camera housing and provides a difference signal which represents the extent to which the stabilized lens fails to follow the camera's motion by some predetermined amount. This difference signal is transmitted to a means for increasing the erection force upon the stabilized lens' erecting mechanism whereby the lens' erection rate increases. Hence, insofar as the camera may be subjected to external vibrations the lens remains substantially stable in space. On the other hand, if the camera is intentionally rotated such as, for example, during panning, the increased erection forces tend to cause the lens to precess so as to follow the camera housing motion. Moreover, when the photographer increases his panning rate this increase in panning speed is sensed and the lens' erection rate automatically increases by an amount that is just sufficient for the stabilized lens to follow the camera's motion.

By mounting a mating lens in a moving picture camera's housing in front of the stabilized lens so as to form a Boscovich type of wedge, an image viewed through the wedge and the focusing lens remains stable at the focal plane of the focusing lens irrespective of the motion between the wedge elements. A wedge of this type is more fully described and explained in United States Patent No. 2,180,017 entitled, "Camera With Range Finder," and issued to Carl Ort on Nov. 14, 1939. In this manner, the image at the focal plane of the focusing lens remains stable even though the housing of the camera is subjected to undesirable vibrations. Moreover, although the camera is panned at widely varying panning rates its automatically variable precessive abilities permit the image of the thusly panned subject to stably appear at the camera's focal plane.

A movie camera is perhaps the most common type of optical device wherein instrument vibration and inability to form an image of a desired subject defeats the purposes for which the instrument is intended. For this reason, although suitable for use in a wide variety of instruments, a preferred embodiment of the invention will herein be illustrated as being used in combination with a movie camera.

The foregoing and other objects, features, and advantages of this invention will be apparent from the following more particular description of a preferred embodiment thereof as illustrated in the accompanying drawings; wherein the same reference numerals refer to the same parts throughout the various views. The drawings are not necessarily intended to be to scale but rather are presented so as to illustrate the principles of the invention in clear form.

Figure 1:
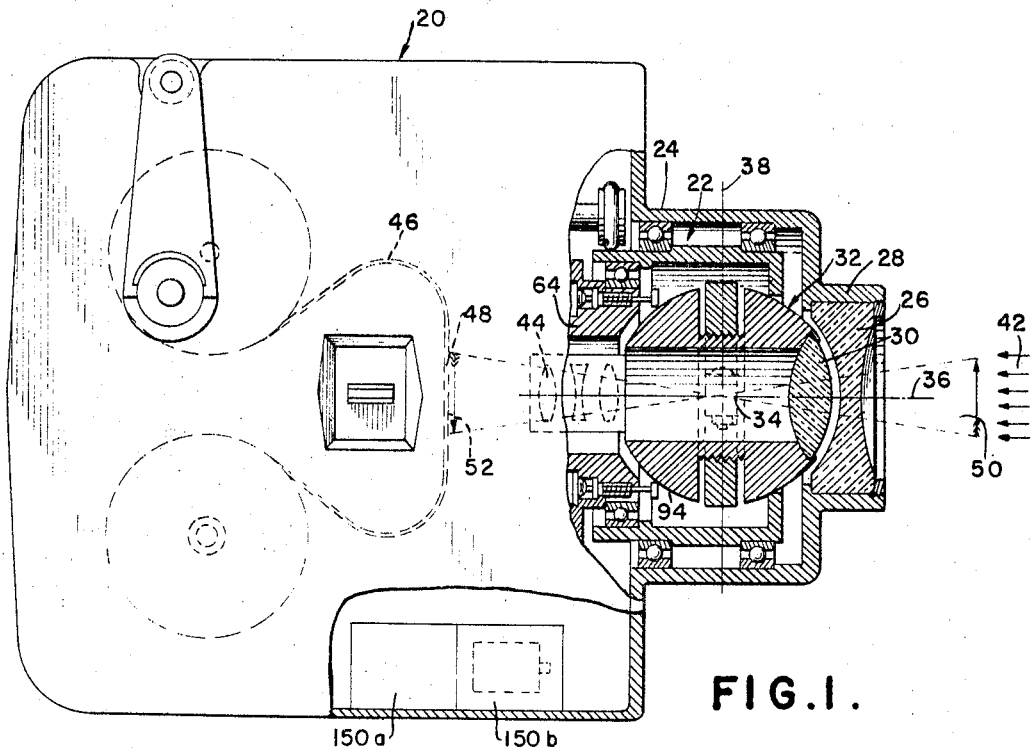
FIG. 1 is a side view of a camera partially broken away to illustrate the incorporation therein of an embodiment of the invention illustrated in FIG. 2.

Referring to FIG. 1, the invention is illustrated by way of example as being embodied in a movie camera 20. The movie camera has a lens stabilization system 22 mounted in a housing 24 at the forward end of the camera. A lens element 26 is mounted in a groove 28 of the housing as shown in FIG. 2 which illustrates the lens stabilization system 22 as it is broken out of the camera of FIG. 1.

A spherical lens element 30 is located on the right side of a substantially spherically surfaced member 32. In the embodiment being described the lens element 30 and the spherically surfaced member 32 have the centers of their spherical surfaces at point 34 in FIG. 1 which represents the intersection of the horizontal axis 36 and a vertical axis 38. The center of the spherically surfaced member is hollowed out behind the lens 30 to form a hollow cylinder 40 whose axis corresponds to the horizontal axis 36 in the figures. Hence, light entering from the right in FIG. 1, as illustrated by arrows 42, is permitted to pass through the lens elements 26 and 30; through the cylindrical inner portion 40 of the spherically surfaced member 32 through additional ones of the camera's focusing lenses 44 and onto the camera's film 46 located at the focal plane 48 of the entire lens system comprised of camera lenses 44 and the stabilized lens system 22. In this manner an object 50, which it is desired to photograph, has its image 52 focused on the camera's film 46 as shown in FIG. 1.

The sphere 32 has a balancing groove 54 running about its entire surface, the balancing groove being symmetrical about a line which is slightly to the left of the vertical axis 38. The inner portion of 54 of the balancing groove is threaded for engagement with a balancing ring 58 which is balanced by selected removal of material from a groove 60 running about the circumference thereof. Once mounted in the groove 54 of the spherically surfaced member 32 the balancing ring 60 can be screwed to the left or the right in FIG. 2 to counterbalance the weight of the spherical lens element 30. In this manner, the spherically surfaced element, the balancing ring, and the lens 30 comprise a rotor assembly referred to generally as 62 which is statically and dynamically balanced about the point 34.

Figure 2:
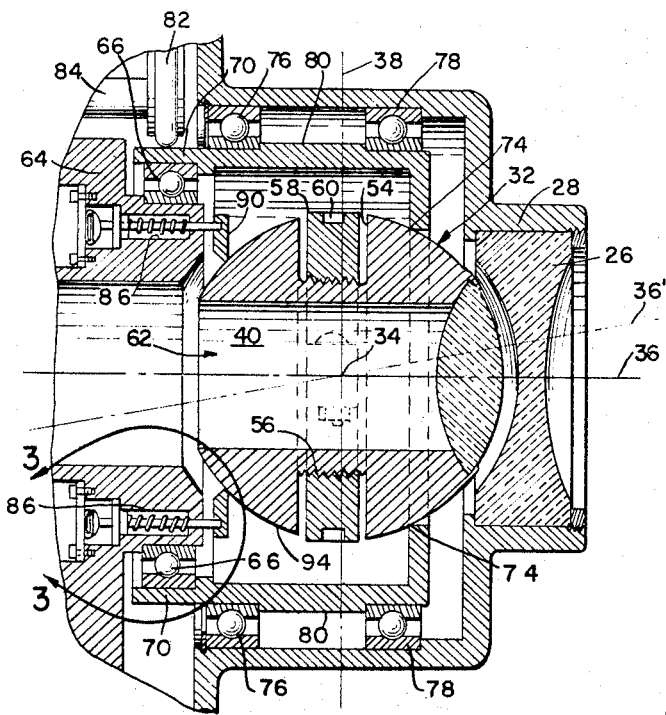
FIG. 2 is a fragmentary side elevational view of a portion of the variable erection rate structure of the invention as it is broken out of FIG. 1.

The camera housing has a drive support member 64 surrounding the inner camera lenses 44 and extending towards the right in FIGS. 1 and 2. Mounted about an outer surface of the drive support member 64 is a bearing assembly 66. A rotor drive member 68 has the left end 70 thereof mounted about the outer race of the bearing assembly 66 so that the rotor drive member is rotatable about the horizontal axis 36. The other end 72 of the rotor drive member engages with spherically surfaced portion 74 of the rotor assembly 62. The rotor drive member is substantially cylindrical and hence rests upon spherical drive surface 74 so as to form a circle of contact about the spherical surface.

A second set of bearing assemblies 76 and 78, positioned between the outer cylindrical surface 80 of the rotor drive member 68 and the camera housing 24, permits rotation of the rotor drive member within the housing. A suitable drive means, herein illustrated as rubber ring 82 on a drive shaft 84 of a drive motor not shown, is used to rotate the rotor drive member 68 about its drive axis 36. Hence, the rotor drive member 68 rotates between bearing assemblies 66 and 76 at the left end of FIG. 2, and between bearing assembly 78 and its circle of contact on the spherical drive surface 74 at its other end.

In operation the rotor assembly 62 is dragged around the axis 36 by the rotor drive member. This is caused by the frictional forces between the drive means 68 and the spherical surface 74 at their circle of contact. Once the rotor assembly is brought up to a sufficient speed it acts as the rotor of a gyroscope and hence is stable in space about the axis 36 which, insofar as the rotor is concerned, is its spin axis. Consequently, after the rotor has obtained its spatial stability, motion of the camera housing, and thereby the rotor drive member 68, away from the spin axis 36 causes the circle of contact to move across the spherical drive surface 74 so that the drive axis becomes displaced from the rotor's axis. For example, when the camera is vibrated upwardly and downwardly about a horizontal axis, the rotor, although spatially stable, pivots with respect to the camera housing about a horizontal axis through point 34. This displacement is illustrated in FIG. 2 by a displaced axis 36′ representing the displaced drive axis of the rotor drive member with respect to the rotor's spin axis.

The drive support member 64 has a plurality of channels 86 located about the circumference thereof. Only two of these channels are shown in FIG. 2 and the lower channel is broken out as a developed sectional view in FIG. 3, to which reference will now be made. A plunger 88 is located in each channel and at the end of each plunger is a friction member 90 having a knife edge 92 thereof in contact with a spherical friction erection portion 94 of the spherically surfaced member 32. Each plunger 88 extends into the rotor drive member through a slot 96 into an opening 98 which is closed at one end by a cap 100 affixed to the rotor drive member by any suitable means such as screws 102. A threaded portion 104 of each plunger 88 has a washer or the like 106 threaded thereon. A spring 110 surrounds the plunger 88 between the washer 106 and the right end of opening 98 where the plunger enters the slot 96. In this manner the plunger is biased towards the left in FIG. 3 and the force of the knife edge 92 upon the spherical friction portion 94 of the rotor's spherically surfaced member is dependent upon the threaded position of the washer 106.

Figure 3:
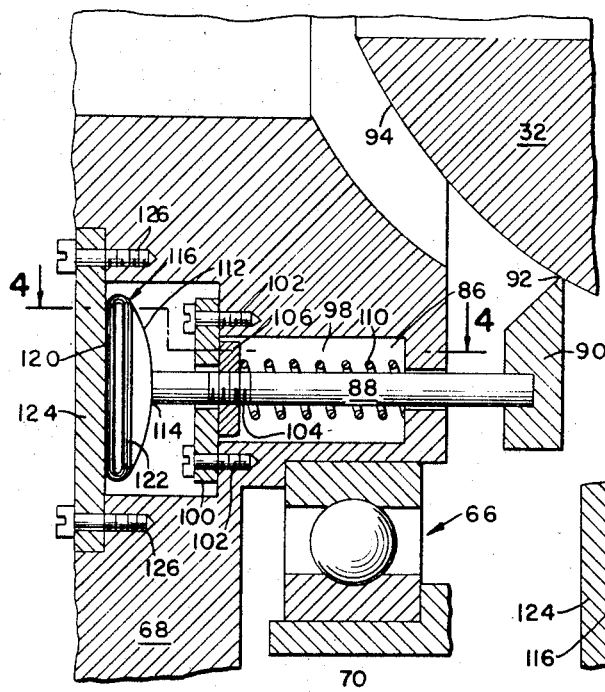
FIG. 3 is a developed section taken along the arc 3—3 in FIG. 2.
Figure 4:
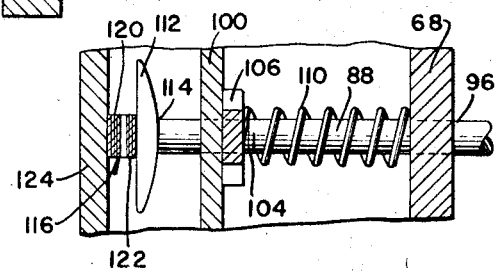
FIG. 4 is a fragmentary sectional view of a ribbon-coil transducer used in the structure of FIG. 3.

A head 112 is pressed onto the leftmost end of the plunger 88 at 114 with the head's left side contacting a flat ribbon coil 116 as shown. The flat ribbon coil 116 has two legs 120 and 122 as is more fully shown in FIGS. 4 and 5. The left leg 120 of the coil abuts a cap or plate 124 which is affixed to the rotor drive member 68 by means of suitable fasteners such as screws 126, while the right leg 22 merely rests against the head 112. Basically, the coil 116 functions to selectively urge the head 112 and thereby the plunger 88 and knife edge 92 to the right in FIG. 3. That is, when an electrical current is passed through the coil 116 the magnetic field due to the current urges the legs 120 and 122 away from each other by an amount corresponding to the current flow. As is more clearly illustrated in FIG. 4, whenever a current is passed through the coil 116 the right leg 122 thereof moves to the right forcing head member 112 and the plunger to the right, overcoming the bias of spring 110, and increasing the frictional forces between the knife edge 92 and the spherical surface 94 of the spinning rotor. A coil of this type is more fully described in United States Patent No. 3,117,256 which issued to Rodger L. Gamblin on Jan. 7, 1964 and hence will not be described herein.

Figure 3A:
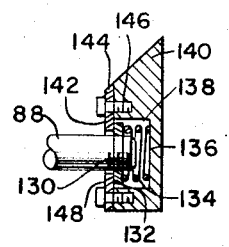
FIG. 3a is a side view partially in section of an alternative form of a friction element illustrated in FIG. 3.

An alternative structure for the friction member 90 is illustrated in FIG. 3a wherein the rightmost end of the plunger 88 is threaded at 130 to accommodate a threaded washer 132. A light spring 134 is held between the washer 132 and a face 136 of a recess 138 in an alternatively structured friction member 140. The friction member 140 is held onto the end of the plunger 88 by means of a cap 142 which is fastened at its outer portion to the friction member 140 by any suitable means such as screws 146 and held in place about the plunger 88 at the cap's inner portion 148 by the coaction of the washer 132 and the spring 134. When this type of friction member is mounted on the plunger 88 the friction member is biased to the left by spring 110 and to the right by spring 134. In this manner the knife edge's force upon the frictional surface 94 of the rotor is dependent upon both the instantaneous current flowing through the coil 116 and the instantaneous differential between the forces of springs 110 and 134. For a given current through the legs of the coil 116, therefore, the force of the knife edge 92 upon the portion 94 of the rotor's spherical surface can be varied by changing the threaded positions of the washers 106 and 132. On the other hand, for given positions of the washers 132 and 106 the force of the knife edge 92 upon portion 94 of the rotor's spherical surface is varied by changing the current through the legs 120 and 122 of the coil 116. When the FIG. 3 embodiment of the friction member is employed the knife edge's force upon the rotor is similarly varied, but because the differential spring 134 is no longer present the structure is not quite as sensitive as in the FIG. 3a embodiment.

Prior to describing the operation of the above described structure reference will now be made to FIGS. 6 and 7 and 8 which illustrate a device for changing the current through the coil 116 in accordance with the camera's panning rate. The lower right hand portion of the camera in FIG. 1 houses a panometer or rate gyro system 150 which senses the camera's panning rate and produces a signal output which is proportional to the instrument's rate of panning. Two such rate gyro systems are shown in FIG. 1: one for sensing horizontal panning rate (150b) and the other for sensing vertical panning (150a). Because both gyro systems are substantially identical, however, only the horizontal panning rate gyro 150b will be further described.

Figure 6:
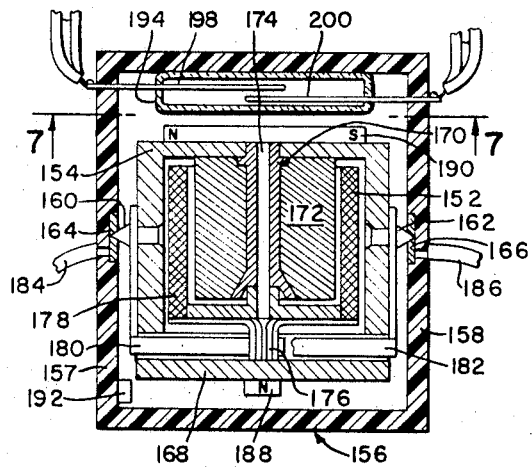
FIG. 6 is a horizontal sectional view taken along the axis of a rotor of a device for sensing changes in the camera's panning rate.

In FIG. 6 a gimbal ring 154 is shown as being pivotally mounted between support walls 157 and 158 of a nonconductive housing 156 by means of pins 160 and 162, each of which has one end thereof fastened to the gimbal ring 154 and the other end thereof mounted in bearings 164 and 166, respectively. In this manner, a rotor 152 which is rotatably mounted in the gimbal ring 154 is pivotable within the camera about an horizontal axis defined by the axes of the gimbal pins 160 and 162.

The rotor 152 is mounted, by means of a commutator ring 168 for rotation about a shaft 170 to which is fastened a stator element 172. The shaft 170 is fastened to the front of the gimbal ring 154 at 174 as shown in FIG. 6. The stator 172 is comprised of a magnet and the rotor is rotatable about the shaft 170 on a bearing assembly 176. The rotor is driven by means of an electrical potential applied to coils 178 thereof through the commutator ring 168. In one preferred embodiment the electrical potential is derived from a set of batteries not shown and delivered to a set of brushes 180 and 182 by means of wires 184 and 186, respectively. Hence, as the electrical potential is applied to the commutator ring the rotor rotates about a spin axis which is coaxial with the shaft 170 and therefore horizontal in FIG. 1. Because of the rotation of the mass of the rotor 152 about the shaft 170, the structure just described also functions as a gyroscope that is stabilized against movement away from its spin axis. Consequently, whenever the rotor is rotating, the rotor's spin axis tends to remain stationary in space.

A permanent magnet 188 is located at the rear of the gimbal ring 154 and another permanent magnet 190 is located at the forward portion thereof as shown. Still another permanent magnet or soft iron bar 192 is vertically located on the nonconducting supporting wall 156 opposite the permanent magnet 188. A plurality of reed switches 194 (see also FIG. 7) are horizontally located along a forward supporting wall 194 of the nonconductive housing.

Figure 7:
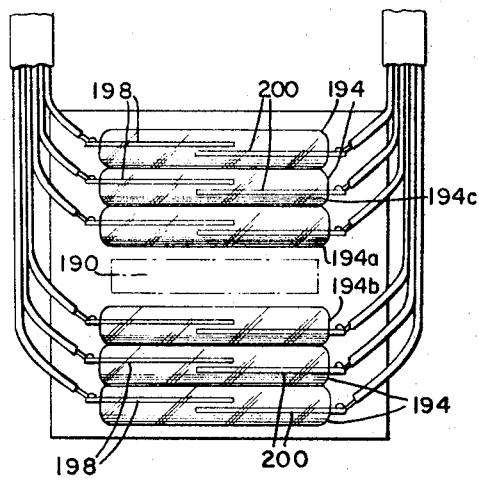
FIG. 7 is a vertical sectional view taken along the lines 7—7 in FIG. 6 illustrating a plurality of reed switches incorporated in a preferred embodiment of the invention's condition sensing structure.

The individual reeds 198 and 200 of the reed switches are normally separated from each other as illustrated in FIG. 7. When thusly separated, the magnet 190, shown in phantom in FIG. 7, is horizontally located between the innermost reed switches 194a and 194b. The reeds 198 and 200 are adapted to move back and forth, however, so as to make and break contact with each other. That is, in a sufficiently strong magnetic field the reeds of a given switch are attracted to each other whereby they make contact. Hence, when a reed switch is subjected to a sufficiently strong magnetic field the switch is closed, but when the magnetic field is sufficiently diminished the switch opens. That is to say, the reed switches are of the normally open type.

Figure 8:
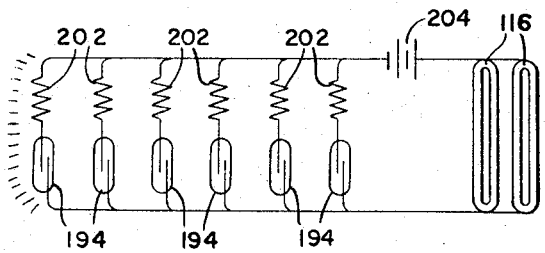
FIG. 8 is a schematic diagram of an electrical circuit which is suitable for use with an embodiment of the invention illustrated in connection with FIGS. 6 and 7.

Each of the reed switches is electrically connected in parallel with each other and each reed switch is connected in series to a corresponding resistor 202 as shown in FIG. 8. All of the thusly parallel connected reed switch-resistor series combinations are connected in series with a suitable source of electrical potential such as a battery 204 which in turn is series connected to one or more ribbon coils 116 which are connected in parallel with each other. In this connection it should be noted that although one such coil fulfills the objects of the invention, two ribbon coils have been illustrated and more coils can be used if so desired.

Having described a suitable structure of a camera's panning rate sensing mechanism its operation will now be described, after which its coaction with the lens stabilization system will be discussed. Prior to the time that a user takes pictures with a camera embodying the invention he should apply power to the panometer rotor 152. Once the rotor is up to speed it tends to remain stable against movement away from its spin axis. At that time the lines of force of the magnet 190 do not sufficiently link the reeds of any of the switches 194 and they are left open whereupon no current flows through the coils 116.

The magnetic forces of the stator 172 and the permanent magnet 188 act upon the bar or magnet 192 to form a magnetic spring. That is, the magnetic forces therebetween tend to resist pivotal motion of the rotor about the axis defined by gimbal pins 160 and 162. Depending upon various well known parameters of the rate gyro, therefore, so long as the camera is panned at less than some predetermined rate none of the reed switches are closed and no current flows through coil 116. As soon as this predetermined rate is exceeded, however, the gyroscopic action of the rotor causes the magnetic spring forces to be overcome to the point where the rotor pivots upwardly or downwardly in FIG. 1 and the lines of the force of the permanent magnet 190 link the various reeds of the switches 194; the number of switches that are thusly actuated depending upon the amount that the rotor pivots which in turn depends upon the speed with which the camera is panned. In this manner, the faster the camera is panned the greater the number of reed switches that are actuated, and the greater the current that flows through the ribbon coils 116.

In the schematic diagram of FIG. 8 it is assumed that each of the resistors 202 are of equal magnitude and that pivotal motion of the rotor that is sufficient to actuate reed switch 194c in FIG. 7 holds the reeds of switch 194a closed at the same time. It will be appreciated, however, that various configurations of reed switches and resistors can be employed without departing from the spirit of the invention. For example, it might be that the configuration of the lines of force of the permanent magnet 190 is such that the reeds of switch 194a are opened at such time as the reeds of 194c are closed. In this event it would be desirable to design the resistor associated with the reed switch 194c to have a smaller resistance than the resistor associated with switch 194a. In other words, when employed in combination with the structure of FIG. 3, the resistor-reed switch configurations should be such that the current through the coil 116 increases as the camera's panning rate increases, but the particular resistor-reed switch configuration that gives rise to this result is of no import. Similarly, as will be appreciated more fully later, although the invention is being described in connection with reed-switch transducers to sense a change in a camera's panning rate, it will be appreciated that other types of transducers may be used to sense other changes without departing from the scope of the invention.

Having described preferred structures and operations of various portions of the invention their overall coaction and operation will now be described. When the rotor assembly 62 is spinning it is stable in space about the axis 36. As the camera is panned, therefore, the rotor assembly and the lens 30 maintain their spatial position while the camera housing and the lens 26 pivot with respect thereto. At this time, the frictional forces exerted upon the rotor's spherical surfaces at 74 and 94 cause torques about the vertical axis 38 in FIG. 2 whereby the rotor assembly tends to erect itself into alignment with the camera housing by precessing about the horizontal axis through point 34. The larger the frictional forces exerted upon the rotor's spherical surface the larger the torques about the vertical axis 38 and the faster the rotor assembly erects itself into alignment with the camera housing. As will now be described, as the panning rate increases the panning rate sensing device causes the current through coil 116 to increase which in turn causes an increase in the frictional forces between the friction element 90 and the rotor's spherical surface 94 which in turn cause more rapid erection. Hence, the lens 30 precesses into alignment with the fixed lens 26 more rapidly as the camera is panned more rapidly.

As the camera's panning rate increases the various reed switches 194 close accordingly; the current through coils 116 increases; and the right legs of the coils move to the right in FIG. 3. As the legs 122 move to the right the plunger 88 overcomes the bias of springs 110; the pressure of friction member 90 upon the spherical surface 94 increases and the rotor erects more rapidly. Moreover, by merely changing the sensitivity of the switches; or the sizes of the associated resistors; or the electrical characteristics of the coils 116; or even by changing the bias force of spring 110, the panning rate at which the rotor's erection rate increases can be selectively varied. In addition because an increase in the frictional forces upon the rotor decreases the stabilization sensitivity of the rotor the above described mechanism provides a structure for automatically varying the frequency at which a stabilized lens becomes sensitive. In other words, as erection friction increases low frequency vibrations are no longer filtered out. Perhaps more importantly, however, both the stabilization sensitivity and the stabilized lens' erection rate is automatically varied in accordance with a change in the instrument's operating conditions such as a change in the camera's panning rate.

Although the invention has been described in connection with a stabilized lens in a movie camera it will be apparent that the invention can be embodied in the structure of other types of instruments as well. In a zoom binocular, for example, lens stabilization becomes more important as the binocular's magnification power increases. Hence, as the binocular's operating conditions change, such as a change in magnification power during a zoom operation, its stabilization and erection characteristics can be automatically altered by employing the teachings of the invention. For example, any suitable transducer can be used to detect the binocular's change in magnification and alter the current through the coil 116 in FIG. 2 accordingly. Hence, the frictional forces upon the binocular's stabilized rotor can be altered as its magnification power is changed whereby its stabilization and erection characteristics are automatically modified in accordance with its changes in magnification power.

In addition, it will be appreciated by those skilled in the art that although the invention has been described in connection with a separate rate gyroscope to sense changes in a camera's panning rate, that other types of sensors can also be used. Perhaps the most apparent alternative is to use the spin stabilized lens structure itself to develop a signal indicative of its changing operating conditions. For example, in the above described apparatus a series of sensing coils can be used to sense the changes of relative motion between the stabilized lens and the camera housing. A sensing system of this type is taught in United States Patent No. 2,815,584 to J. R. Watson entitled, "Gyro Combining Limited Freedom and Angular Rate Sensitivity," issued on Dec. 10, 1957. It will be understood, therefore, that the additional rate sensing gyro has been included in the above description merely for purposes of illustration and is not intended to limit the scope of the invention.

Figure 5:
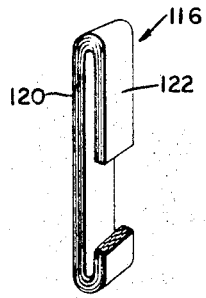
FIG. 5 is a perspective view partially broken away of FIG. 4's ribbon coil.
Figure 11:
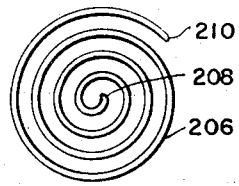
FIG. 11 is a front view of an Archimedean spiral coil that can be used in place of the ribbon coil transducer of FIG. 5.
Figure 12:
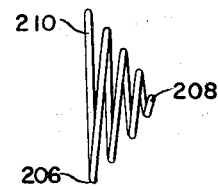
FIG. 12 is a side elevational view of the coil of FIG. 11 at a time when an electric current through the coil causes it to expand into a conical helix.

The invention has been described thus far in connection with a flat ribbon coil 116 as illustrated in FIG. 5. FIGS. 11 and 12, however, illustrate an alternative embodiment of a coil that is similarly suited for use in connection with the structure of the invention. In FIG. 11 a coil 206 is wound in a form of an Archimedean spiral having inner and outer ends 208 and 210. Assuming that all portions of the coil's spirals are initially coplanar, a current through the coil causes its inner end 208 to move outwardly from the paper in FIG. 11, whereupon the Archimedean spiral forms a conical helix configuration as shown in FIG. 12. By mounting the coil 206 between the cap 124 and the head 112 in FIG. 4, therefore, the coil 206 functions in a manner similar to that of the coil 116. Because a thusly modified structure of the invention will be readily understandable to those skilled in the art both as to structure and operation it will not be further described herein.

Figure 10:
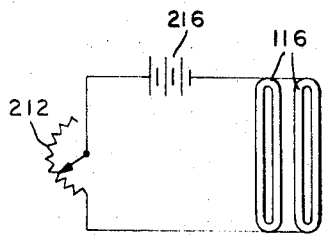
FIG. 10 is a schematic diagram of an electrical circuit which is suitable for use with the embodiment of the invention illustrated in connection with FIG. 9.
Figure 9:
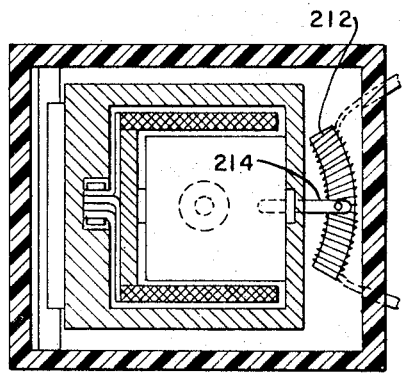
FIG. 9 is a horizontal sectional view taken along the axis of a rotor illustrating an alternative embodiment of the invention's condition sensing mechanism wherein a variable resistor is substituted for the reed switches of FIGS. 6 and 7.

Other structural modifications may also be made in the invention's structure and still be within its spirit and scope. An example of such a modification is shown in FIG. 9. FIG. 9 is in all respects similar to that of FIG. 6 except that the reed switches 194 in FIG. 6 have been replaced by a rheostat 212, and the permanent magnet 190 is replaced by a wiper arm or the like 214. The operation of the structure of FIG. 9 is also similar to that previously described except that instead of a sequential closing of reed switches causing the current in the coils 116 or 206 to change, the variation of the rheostat's resistance caused by progressively changing positions of the wiper arm 214 causes the current through the coils to change. This is illustrated in FIG. 10 where the rheostat 212 is connected in series with both a battery 216 and the ribbon coils 116 which are connected with each other in parallel. In all other respects the structure and operation of FIGS. 9 and 10 are the same as previously described.

Figure 13:
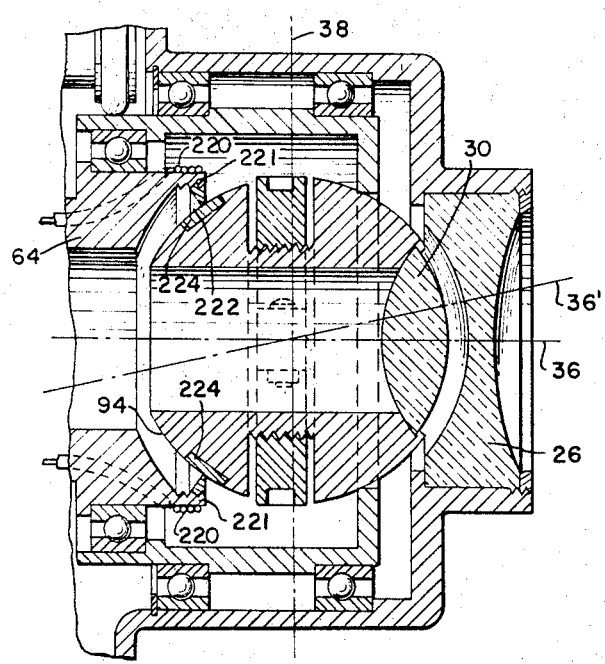
FIG. 13 is a fragmentary sectional elevational view of an alternative embodiment of the structure in FIG. 2.

FIG. 13 illustrates still another embodiment of the invention. The structure of FIG. 13 is in many respects the same as that of FIG. 2. Hence, to the extent that it is the same as the FIG. 2 device the FIG. 13 embodiment will not be further described. In FIG. 13, however, the expanding coils and the friction members 90 have been eliminated along with their associated elements. Instead, the drive support member 64 has a coil 220 wound about a lip 221 on a portion of the drive support member 64 surrounding a portion 222 of the rotor's spherical surface corresponding to portion 94 in FIG. 3. A paramagnetic insert 224 also comprises a portion of the rotor's spherical surface 222 and is located directly within the field of the coil 220.

In operation, a current through the coil 220 sets up eddy currents in the insert 224. These eddy currents act in a manner similar to the frictional forces in the former embodiment, and create a torque about the rotor's vertical axis 38 which in turn causes the rotor and the stabilized lens 30 to precess into alignment with the camera housing so that the axes of the lenses 30 and 26 are brought into alignment. Moreover, as the camera's panning rate increases the current through the coil 220 increases in the same manner as has been previously described; the eddy currents in the insert 224 increase; the torques about the torque axis 38 increase; the rotor precesses more rapidly; and the stabilized lens 30 is brought into alignment with its companion lens at a more rapid rate. Consequently, this embodiment of the invention also provides a structure for automatically changing the rotor's precession rate in accordance with the camera's panning rate. More broadly speaking, therefore, as the instrument's operating conditions change, the stabilized element's erection rate automatically changes in accordance therewith.

While the invention has been particularly shown and described with reference to preferred embodiments thereof, it will be understood by those skilled in the art that various changes in form and details may be made therein without departing from the spirit and scope of the invention. For example, the action of the various embodiments has been described in connection with panning and vibration in vertical and horizontal planes. That is, the erection of the rotor has been described in connection with panning in a vertical plane while the more detailed operation of the panning rate sensing device has been described in connection with panning along a horizontal plane. As previously noted, however, these particular panning planes have been discussed merely for purposes of ease of illustration. Hence, it will be understood that the embodiments disclosed herein are not limited to panning in a single plane but apply equally well when the panning motion has both a vertical and a horizontal component.

The embodiments of the invention in which an exclusive property or privilege is claimed are defined as follows:

1. In a spin stabilized instrument of the type in which a spin stabilized member is erected into alignment with an instrument housing by applying a frictional force to a spherical surface on said spin stabilized member, a device for automatically changing the erection rate of said spin stabilized member in accordance with changes in operating conditions of said instrument, comprising:
    precessor means for applying a frictional precessive force to said spherical surface;
    sensing means for sensing said changes in operating conditions and generating a change signal representing the amount of said change;
    and means for delivering said change signal to said precessor means, said precessor means being operative in response to said change signal to change said frictional precessive force in accordance with said change signal, whereby said erection rate changes in accordance with said changes in operating conditions.

2. In a spin stabilized instrument of the type in which a spin stabilized member is erected into alignment with an instrument housing by applying a frictional precessive force to a spherical surface on said spin stabilized member, a device for automatically changing the erection rate of said spin stabilized member in accordance with changes in operating conditions of said instrument, comprising:
    means for applying a variable frictional force to said spherical surface, comprising:
        a coil having a first portion thereof affixed to said housing;
        means for applying an electrical current through said coil, said coil being operative in response to said electrical current to have a second portion thereof move with respect to said housing;
        and a friction element adapted to frictionally engage said spherical surface and operatively connected to said second portion of said coil so that motion of said second portion of said coil causes said friction element to increase its frictional force on said spherical surface;

sensing means for sensing said changes in operating conditions and generating a change signal representing the amount of said change;

and means for delivering said change signal to said means for applying said electrical current to said coil so that said electrical current and the motion of said second part of said coil, and thereby said frictional precessive force, vary in accordance with said change signal, whereby said erection rate changes in accordance with said changes in operating conditions.

3. The apparatus of claim 2 wherein said coil is of the flat ribbon type.

4. The apparatus of claim 2 wherein said coil is of the Archimedean spiral type.

5. The apparatus of claim 2 wherein said sensing means senses motion of said spin stabilized member with respect to said housing.

6. The apparatus of claim 5 wherein said coil is of the flat ribbon type.

7. The apparatus of claim 5 wherein said coil is of the Archimedian spiral type.

8. The apparatus of claim 5 wherein said motion sensing means includes a variable resistance means the resistance of which is variable in accordance with said relative motion between said spin stabilized member and said instrument housing.

9. The apparatus of claim 8 wherein said variable resistance means includes a plurality of reed switches for controlling the variation of said resistance.

10. The apparatus of claim 9 wherein said coil is of the flat ribbon type.

11. The apparatus of claim 9 wherein said coil is of the Archimedean spiral type.

12. The apparatus of claim 8 wherein said variable resistance means includes a rheostat.

13. The apparatus of claim 12 wherein said coil is of the flat ribbon type.

14. The apparatus of claim 12 wherein said coil is of the Archimedean spiral type.

15. In an optical instrument of the type in which a spin stabilized rotor is erected into alignment with an instrument housing by applying a precessive force to said spin stabilized rotor, a device for automatically changing the erection rate of said spin stabilized rotor in accordance with changes in motion of said optical instrument, comprising:

a housing;

a first lens mounted in said housing;

a second lens mounted on said spin stabilized rotor;

said spin stabilized rotor being located within said instrument housing so that said first and second lenses form an optical wedge;

precessor means for applying said precessive force to said spin stabilized rotor;

sensing means for sensing said change in the instrument's motion and generating a change signal representing the amount of said change; and means for delivering said change signal to said precessor means, said precessor means being operative in response to said change signal to change said precessive force in accordance with said change signal, whereby said erection rate changes in accordance with said change in motion of said optical instrument.

16. In a spin stabilized optical instrument of the type in which a spin stabilized rotor is erected into alignment with an instrument housing by generating precessive eddy currents in said spin stabilized rotor, a device for automatically changing said eddy currents and thereby the erection rate of said spin stabilized rotor in accordance with the changes in motion of said instrument, comprising:

a housing;

a first lens mounted in said housing;

a second lens mounted on said spin stabilized rotor;

said spin stabilized rotor being located within said housing so that said first and second lenses form an optical wedge;

eddy current means on said spin stabilized rotor adapted to have eddy currents circulated therein;

a precessor means for generating a magnetic field;

sensing means for sensing said changes in the motion of said instrument housing and generating a change signal representing the amount of said change; and means for delivering said change signal to said precessor means, said precessor means being operative in response to said change signal to change said magnetic field in accordance with said change signal, whereby the eddy currents in said spin stabilized rotor, and thereby said erection rate change in accordance with said changes in the motion of said instrument housing.

17. In a spin stabilized optical instrument of the type in which a spin stabilized member is erected into alignment with an instrument housing by applying a frictional force to a spherical surface on said spin stabilized member, a device for automatically changing the erection rate of said spin stabilized member in accordance with changes in operating conditions of said optical instrument, comprising:

a housing;

a first lens mounted in said housing;

a second lens mounted on said spin stabilized member;

said spin stabilized member being located within said housing so that said first and second lenses form an optical wedge;

a precessor means for applying a frictional precessive force to said spherical surface;

sensing means for sensing said changes in operating conditions and generating a change signal representing the amount of said change;

and means for delivering said change signal to said precessor means, said precessor means being operative in response to said change signal to change said frictional precessive force in accordance with said change signal, whereby said erection rate changes in accordance with said changes in operating conditions.

18. In a spin stabilized moving picture camera of the type in which a spin stabilized member is erected into alignment with an instrument housing by applying a precessive force to said spin stabilized member and wherein light rays from an object are focused onto a film station, a device for automatically changing the erection rate of said spin stabilized member in accordance with changes in operating conditions of said movie camera, comprising:

a camera housing which includes an object portion and an image portion;

a first lens mounted in said object portion of said housing, said film station being at said image portion of said housing;

a second lens mounted on said spin stabilized member, said spin stabilized member being located within said housing so that said first and second lenses form an optical wedge whereby an image from the object is focused at said film station irrespective of relative motion between said lenses;

precessor means for applying said precessive force to said spin stabilized member;

sensing means for sensing said changes in operating conditions and generating a change signal representing the amount of said change;

and means for delivering said change signal to said precessor means, said precessor means being operative in response to said change signal to change said precessive force in accordance with said change signal, whereby said second lens is adapted to precess into coaxial superposition with said first lens at a rate that changes in accordance with said changes in operating conditions.

19. In a spin stabilized movie camera of the type in which a spin stabilized member is erected into alignment with an instrument housing by generating precessive eddy currents in said spin stabilized member and wherein light rays from an object are focused onto a film station, a device for automatically changing said eddy currents and thereby the erection rate of said spin stabilized member in accordance with changes in operating conditions of said instrument, comprising:

a camera housing which includes an object portion and an image portion;
a first lens mounted in said object portion of said housing, said film station being at said image portion of said housing;
a second lens mounted on said spin stabilized member, said spin stabilized member being located within said housing so that said first and second lenses form an optical wedge whereby an image from an object is focused at said film station irrespective of relative motion between said lenses;
eddy current means on said spin stabilized member adapted to have eddy currents circulated therein;
precessor means for generating a magnetic field;
sensing means for sensing said changes in operating conditions and generating a change signal representing the amount of said change;
and means for delivering said change signal to said precessor means, said precessor means being operative in response to said change signal to change said magnetic field in accordance with said change signal, whereby the eddy currents in said spin stabilized member, and thereby said erection rate, change in accordance with said changes in operating conditions and the axis of said second lens precesses into coaxial superposition with the axis of said second lens at a rate which varies in accordance with said changes in operating conditions.

20. In a spin stabilized movie camera of the type in which a spin stabilized member is erected into alignment with an instrument housing by applying frictional precessive forces to a spherical surface on said spin stabilized member and wherein light rays from an object are focused onto a film station, a device for automatically changing the erection rate of said spin stabilized member in accordance with changes in operating conditions of said movie camera, comprising:

a camera housing which includes an object portion and an image portion;
a first lens mounted on said object portion of said housing, said film station being at said image portion of said housing;
a second lens mounted on said spin stabilized member, said spin stabilized member being located within said housing so that said first and second lenses form an optical wedge whereby an image from an object is focused at said film station irrespective of relative motion between said lenses;
precessor means for applying a precessive force to said spherical surface;
sensing means for sensing said changes in operating conditions and generating a change signal representing the amount of said change;
and means for delivering said change signal to said precessor means, said precessor means being operative in response to said change signal to change said frictional precessive force in accordance with said change signal, whereby the axis of said second lens precesses into coaxial superposition with the axis of said first lens at a rate which changes in accordance with said operating conditions.

21. In a spin stabilized instrument of the type in which a spin stabilized member is erected into alignment with an instrument housing by applying a precessive force to said spin stabilized member, a device for automatically changing the erection rate of said spin stabilized member in accordance with changes in motion of said instrument, comprising:

a plurality of circuit connected resistance elements;
a plurality of reed switches each having one of said resistance elements in circuit connection therewith;
means operative in response to motion of said instrument housing for selectively operating selected reed switches so as to selectively vary the effective resistance of said circuit connected resistance elements;
means under control of said circuit connected resistance elements for generating a change signal proportional to the change in motion of said instrument housing;
precessor means for applying said precessive force to said spin stabilized member; and
means for delivering said change signal to said precessor means, said precessor means being operative in response to said change signal to change said precessor force in accordance with said change signal, whereby said erection rate changes in accordance with said changes in the motion of said instrument housing.

22. In a spin stabilized instrument of the type in which a spin stabilized member is erected into alignment with an instrument housing by generating precessive eddy currents in said spin stabilized member, a device for automatically changing said eddy currents and thereby the erection rate of said spin stabilized member in accordance with changes in motion of said instrument, comprising:

a plurality of circuit connected resistance elements;
a plurality of reed switches each having one of said resistance elements in circuit connection therewith;
means operative in response to motion of said instrument housing for selectively operating selected reed switches so as to selectively vary the effective resistance of said circuit connected resistance elements;
means under control of said circuit connected resistance elements for generating a change signal proportional to the change in motion to said instrument housing;
precessor means for generating a magnetic field; and
means for delivering said change signal to said precessor means, said precessor means being operative in response to said change signal to change said magnetic field in accordance with said change signal, whereby the eddy currents in said spin stabilized member, and thereby said erection rate, change in accordance with said changes in the motion of said instrument housing.

References Cited

UNITED STATES PATENTS

| | | | |
|---|---|---|---|
| 1,402,064 | 1/1922 | Gray | 88—1 |
| 2,417,689 | 3/1947 | Johnson | 74—5.6 X |
| 2,592,417 | 4/1952 | Hale | 74—5.6 X |
| 2,709,922 | 6/1955 | Knutson | 74—5.6 |
| 2,951,377 | 9/1960 | Lahde | 74—5.46 X |
| 2,959,088 | 11/1960 | Rantsch | 88—1 |
| 3,014,376 | 12/1961 | Kenyon | 74—5.4 |
| 2,948,813 | 8/1960 | Osborne. | |

NORTON ANSHER, *Primary Examiner.*

M. H. HAYES, *Assistant Examiner.*

U.S. Cl. X.R.

74—5.45, 5.46; 350—16